United States Patent
Hsu

(10) Patent No.: US 8,212,848 B2
(45) Date of Patent: Jul. 3, 2012

(54) METHOD FOR PRINTING A STEREOGRAPH AND RELATED PRINT DEVICE

(75) Inventor: Fu-Liang Hsu, Taichung County (TW)

(73) Assignee: HiTi Digital, Inc., Taipei (TW)

( * ) Notice: Subject to any disclaimer, the term of this patent is extended or adjusted under 35 U.S.C. 154(b) by 459 days.

(21) Appl. No.: 12/616,082

(22) Filed: Nov. 10, 2009

(65) Prior Publication Data

US 2011/0058007 A1    Mar. 10, 2011

(30) Foreign Application Priority Data

Sep. 10, 2009  (TW) .............................. 98130523 A

(51) Int. Cl.
*B41J 35/16* (2006.01)
*B41J 2/315* (2006.01)

(52) U.S. Cl. ...................................... 347/172; 347/171

(58) Field of Classification Search .................. 347/171, 347/172, 176, 187, 212, 215, 218
See application file for complete search history.

(56) References Cited

U.S. PATENT DOCUMENTS

| | | | | |
|---|---|---|---|---|
| 5,528,420 A | * | 6/1996 | Momochi | 359/463 |
| 5,557,413 A | * | 9/1996 | Ebihara et al. | 358/296 |
| 5,764,266 A | * | 6/1998 | Azuma et al. | 347/171 |
| 6,133,928 A | * | 10/2000 | Kayashima et al. | 347/171 |
| 2003/0068184 A1 | * | 4/2003 | Miyano | 400/582 |
| 2006/0198682 A1 | | 9/2006 | Tsuchiya | |

FOREIGN PATENT DOCUMENTS

| | | |
|---|---|---|
| CA | 2089093 | 12/1992 |
| JP | 11109530 | 4/1999 |
| TW | 558669 | 10/2003 |
| TW | I236641 | 7/2005 |
| TW | M286113 | 1/2006 |
| TW | 200810519 | 2/2008 |

\* cited by examiner

*Primary Examiner* — Kristal Feggins
(74) *Attorney, Agent, or Firm* — Winston Hsu; Scott Margo

(57) ABSTRACT

A method for printing a stereograph includes manufacturing a lenticular lens structure on a surface of a protecting region of a ribbon wherein the ribbon includes a plurality of dye regions and the protecting region, receiving a target image data, conveying a print medium, transferring the plurality of dye regions of the ribbon onto the print medium respectively according to the target image data when conveying the print medium, and transferring the protecting region of the ribbon onto the print medium after transferring the plurality of dye regions of the ribbon onto the print medium.

20 Claims, 4 Drawing Sheets

METHOD FOR PRINTING A STEREOGRAPH AND RELATED PRINT DEVICE

BACKGROUND OF THE INVENTION

1. Field of the Invention

The present invention relates to a method for printing a stereograph and a related printing device, and more particularly, to a method for manufacturing a lenticular lens structure on a protecting region of a ribbon so as to print a stereograph and a related printing device.

2. Description of the Prior Art

A stereograph can transfer a viewer's view angle from two-dimensional space into three-dimensional space, so as to restore a scene with depth of field on the stereograph and to improve a sense of reality of the scene. Thus, the viewer can distinguish a distance and a depth of the scene on the stereograph. Method for producing three-dimensional vision utilizes parallax theory, such as adjusting radian of eyes for changing focal lengths of the eyes and adjusting view angles of the eyes. Because the stereograph shows images having different angles and distances on two eyes of the viewer, respectively, parallax is generated between the images viewed by the two eyes, and the images can be analyzed to generate the three-dimensional vision in the viewer's brain. Stereoscopic imaging technique includes holographic images, grating images, lens images, and so on. A method of applying an optical grating structure to image the stereograph is easier than other methods, and is utilized widespread. Generally, there are two types of common methods for generating the stereograph. One conventional method is printing the images processed by stereographic image processing technique on a back of the optical grating structure directly. The other conventional method is printing the images processed by the stereographic image processing technique on a common print medium, and then gluing the optical grating structure on the common print medium. However, process of gluing the optical grating structure on the print medium is complicated, spends working hours, and needs numerous glue to fix the optical grating structure on the print medium. The conventional methods print the stereograph slowly and increase manufacturing cost. Thus, design of a stereograph printing mechanism capable of printing the stereograph rapidly and having low cost is an important issue in the printing industry.

SUMMARY OF THE INVENTION

The present invention provides a method for manufacturing a lenticular lens structure on a protecting region of a ribbon so as to print the stereograph and a related printing device for solving above drawbacks.

According to the claimed invention, a method for printing a stereograph includes manufacturing a lenticular lens structure on a surface of a protecting region of a ribbon wherein the ribbon comprises a plurality of dye regions and the protecting region, receiving a target image datum, conveying a print medium, transferring the plurality of dye regions of the ribbon onto the print medium respectively according to the target image datum when conveying the print medium, and transferring the protecting region of the ribbon onto the print medium after transferring the plurality of dye regions of the ribbon onto the print medium.

According to the claimed invention, a print device includes an actuating unit for conveying a print medium, a ribbon comprising a plurality of dye regions and a protecting region, a lenticular lens structure being formed on a surface of the protecting region, a thermal print head for transferring the plurality of dye regions and the protecting region of the ribbon onto the print medium, respectively, and a control unit coupled to the actuating unit and the thermal print head for controlling the actuating unit to convey the print medium according to a target image datum and for controlling the thermal print head to transfer the plurality of dye regions and the protecting region of the ribbon onto the print medium, respectively.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
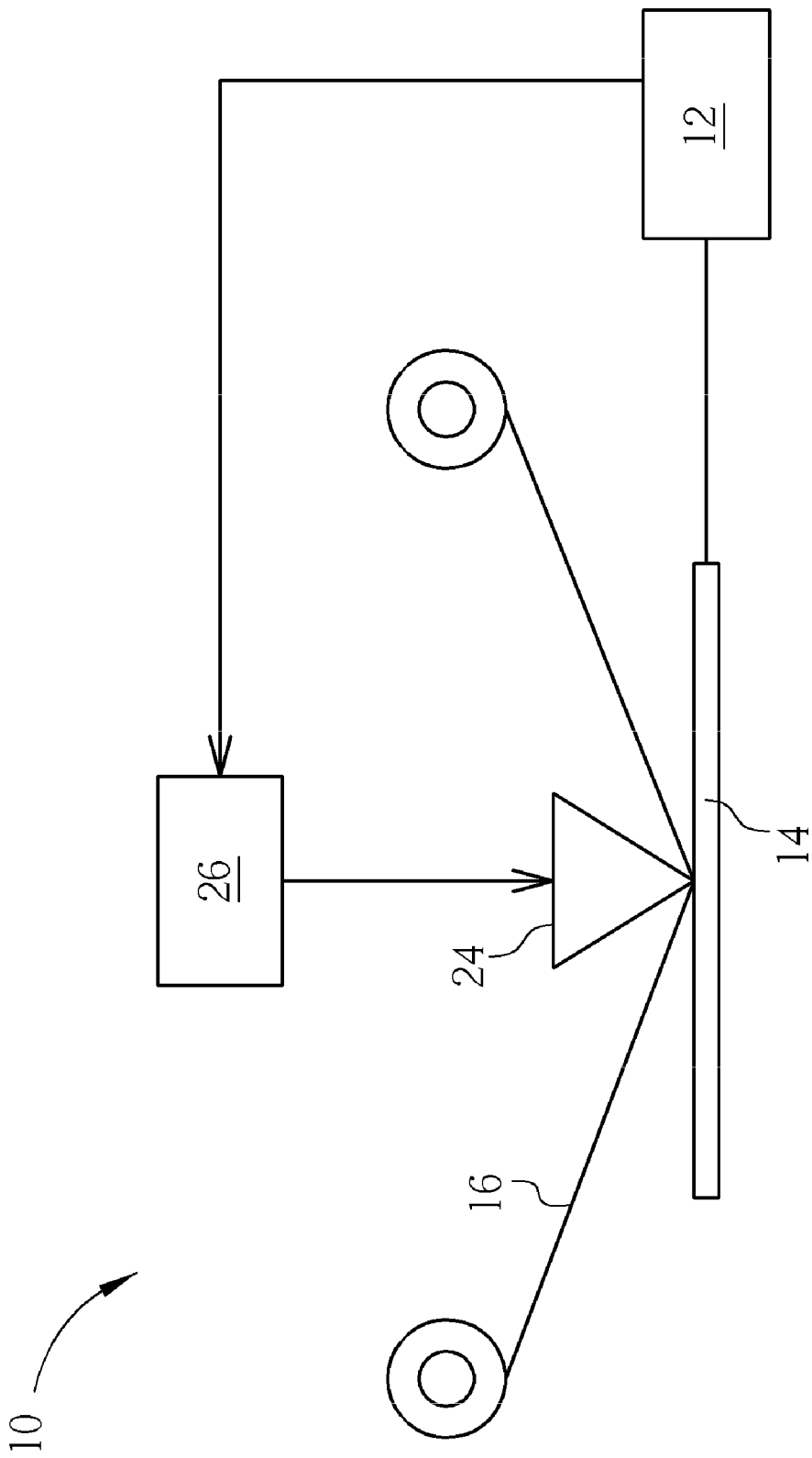
FIG. 1 is a diagram of a print device according to a preferred embodiment of the present invention.

Please refer to FIG. 1. FIG. 1 is a diagram of a print device 10 according to a preferred embodiment of the present invention. The print device 10 can be a dye sublimation printer for printing a stereograph. The print device 10 includes an actuating unit 12 for moving a print medium 14. The actuating unit 12 can include a plurality of driving mechanisms, such as a motor, a roller, and so on. The print device 10 further includes a ribbon 16. The ribbon 16 includes a plurality of dye regions 18 and a protecting region 20. The protecting region 20 is made of high transparency material, and the protecting region 20 further can be made of protecting material having waterproof function, oilproof function, or anti-UV function, so as to prevent the dye regions from being oozed, faded, or polluted by moisture or oil sludge. A lenticular lens structure 22 is formed on a surface of the protecting region 20. The print device 10 further includes a thermal print head 24 for transferring the plurality of dye regions 18 and the protecting region 20 of the ribbon 16 onto the print medium 14, respectively, and a control unit 26 coupled to the actuating unit 12 and the thermal print head 24 for controlling the actuating unit 12 to move the print medium 14 according to a target image datum and for controlling the thermal print head 24 to transfer the plurality of dye regions 18 and the protecting region 20 of the ribbon 16 onto the print medium 14, respectively. The target image datum is processed by stereographic image technique. The target image datum can be an interlaced image datum. For example, the interlaced image datum can be a set of images that is generated by photographing a scene at different view angles and is recorded on the print medium 14 with stripes.

Figure 2:
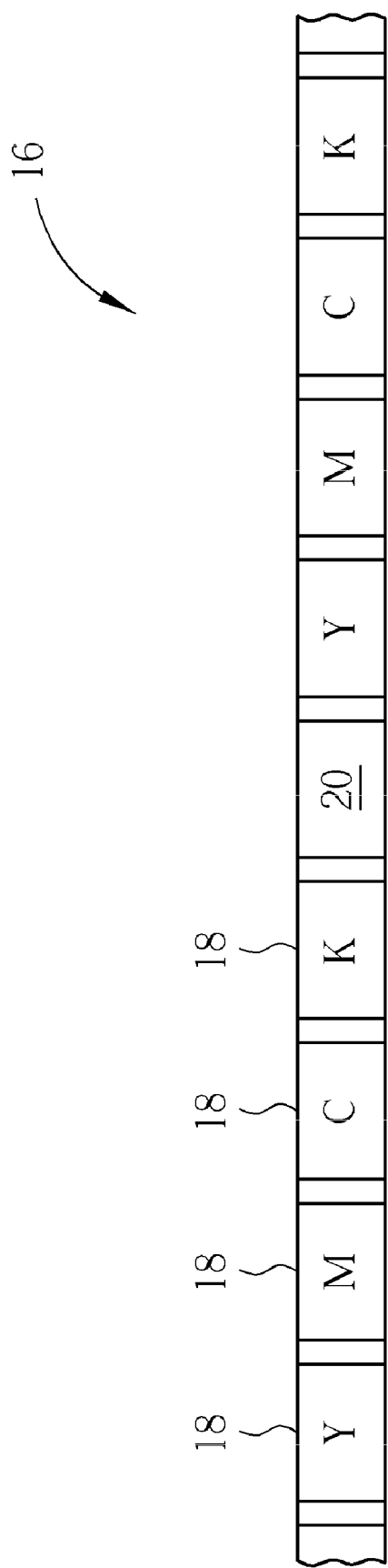
FIG. 2 is a diagram of a ribbon according to the preferred embodiment of the present invention.

Please refer to FIG. 2. FIG. 2 is a diagram of the ribbon 16 according to the preferred embodiment of the present invention. The ribbon 16 includes the plurality of dye regions 18 and the protecting region 20. The plurality of dye regions 18 can include a yellow dye region Y, a magenta dye region M, a cyan dye region C, and a black dye region K. The plurality of dye regions 18 and the protecting region 20 are arranged on the ribbon 16 alternately. The plurality of dye regions 18 can be selected from a group consisting of the yellow dye region Y, the magenta dye region M, the cyan dye region C, the black dye region K, and combination thereof. The plurality of dye regions 18 is not limited to the above-mentioned embodiment and depends on actual demand. The protecting region 20 can be made of soft material, such as polyvinyl chloride (PVC), thermoplastic polyurethane (TPU), and so on. The protecting region 20 can further be made of hard material, such as polyester (PET), polypropylene (PP), and so on. Material of the protecting region 20 is not limited to the above-mentioned embodiment and depends on actual demand. In addition, the plurality of dye regions 18 and the protecting region 20 of the ribbon 16 can be transferred on the print medium 14 in a thermal sublimated manner.

Figure 3:
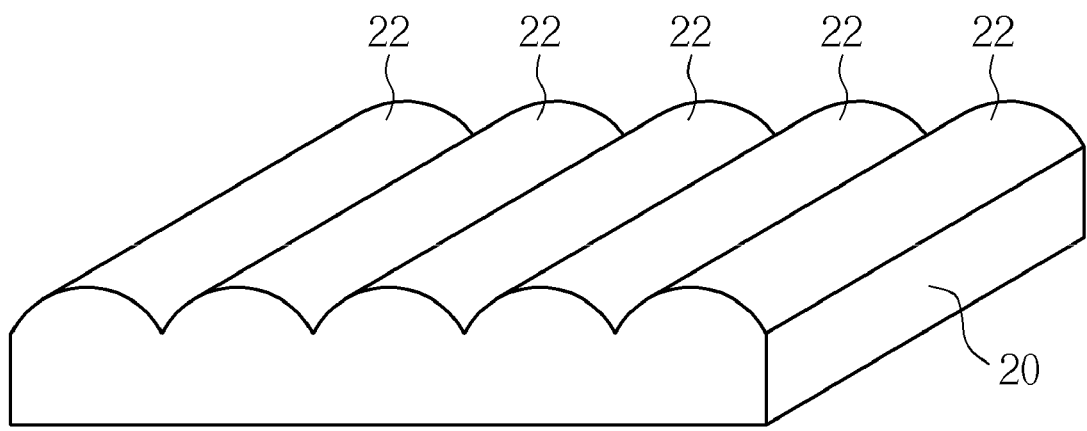
FIG. 3 is a diagram of a protecting region according the preferred embodiment of the present invention.

Please refer to FIG. 3. FIG. 3 is a diagram of the protecting region 20 according to the preferred embodiment of the present invention. The lenticular lens structure 22 is formed on the surface of the protecting region 20 for inflecting light so as to show different images in different view angles. The lenticular lens structure 22 can be made of high transparency material. A plurality of semi-cylindrical structures is formed on a side of the lenticular lens structure 22, and an intact plane is formed on the other side of the lenticular lens structure 22. Distances between the plurality of semi-cylindrical structures of the lenticular lens structure 22 are equal so as to transmit the light reflected from the stereograph on the print medium 14 uniformly. The lenticular lens structure 22 can be a narrow angle lenticular lens structure or a wide angle lenticular lens structure. Generally, the narrow angle lenticular lens structure is suitable to the stereograph having depth of field, and a view angle of the narrow angle lenticular lens structure is substantially between 15 degrees and 44 degrees preferably. The wide angle lenticular lens structure is suitable to a bivariant image, and view angle of the wide angle lenticular lens structure is substantially between 44 degrees and 65 degrees preferably. Selection and structure of the lenticular lens structure 22 are not limited to the above-mentioned embodiment and depend on design demand.

Figure 4:
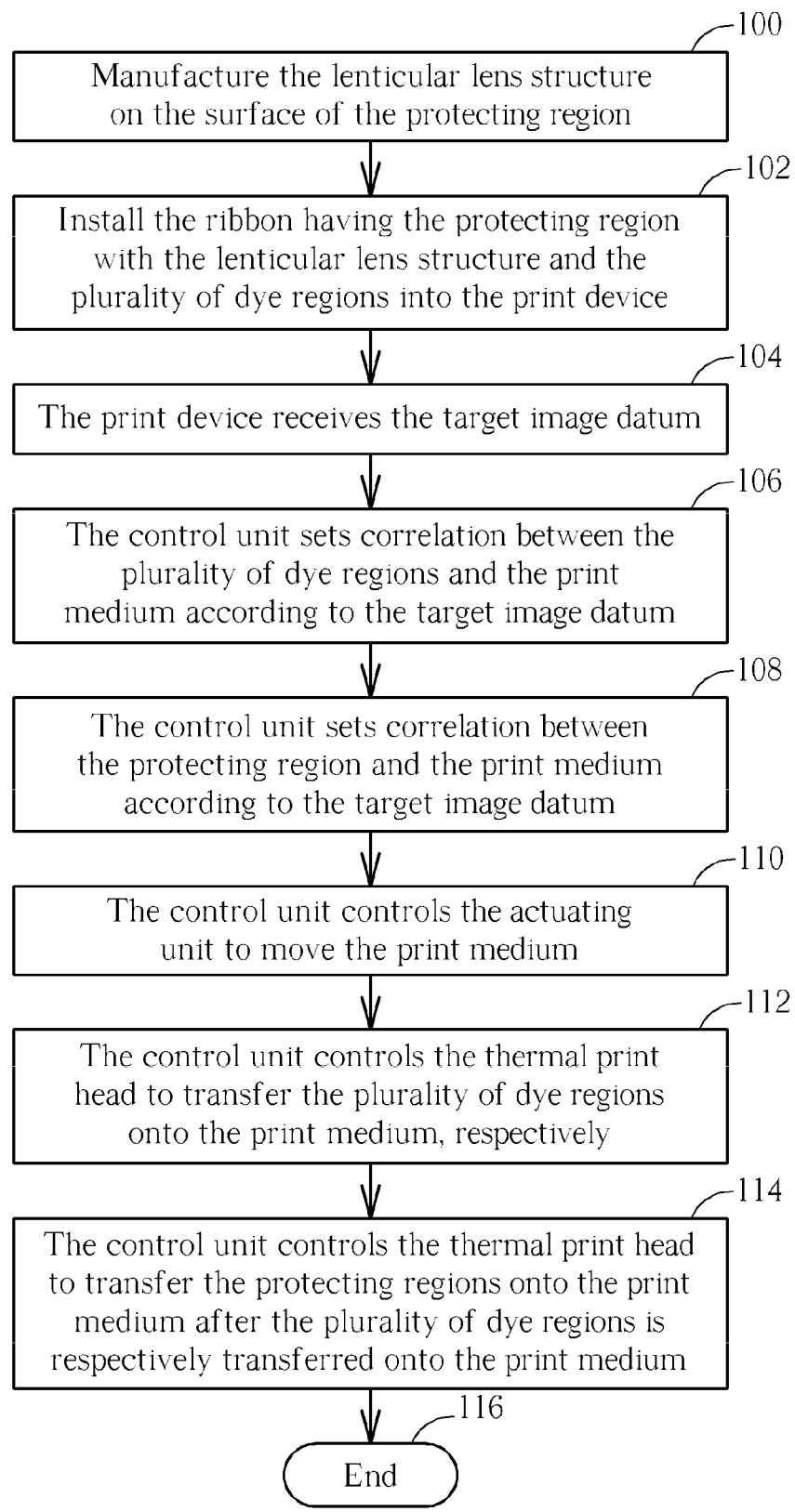
FIG. 4 is a flow chart for printing a stereograph according the preferred embodiment of the present invention.

Please refer to FIG. 4. FIG. 4 is a flow chart for printing the stereograph according to the preferred embodiment of the present invention. The printing method includes following steps:

Step 100: Manufacture the lenticular lens structure 22 on the surface of the protecting region 20;

Step 102: Install the ribbon 16 having the protecting region 20 with the lenticular lens structure 22 and the plurality of dye regions 18 into the print device 10;

Step 104: The print device 10 receives the target image datum wherein the target image datum can be the interlaced image datum;

Step 106: The control unit 26 sets correlation between the plurality of dye regions 18 of the ribbon 16 and the print medium 14 according to the target image datum;

Step 108: The control unit 26 sets correlation between the protecting region 20 of the ribbon 16 and the print medium 14 according to the target image datum;

Step 110: The control unit 26 controls the actuating unit 12 to move the print medium 14;

Step 112: The control unit 26 controls the thermal print head 24 to transfer the plurality of dye regions 18 of the ribbon 16 onto the print medium 14, respectively, according to the target image datum when the print medium 14 is moved;

Step 114: The control unit 26 controls the thermal print head 24 to transfer the protecting regions 20 of the ribbon 16 onto the print medium 14 according to the target image datum after the control unit 26 controls the thermal print head 24 to transfer the plurality of dye regions 18 of the ribbon 16 onto the print medium 14;

Step 116: End.

A detailed description of the printing method is introduced as following. First, the lenticular lens structure 22 is manufactured on the surface of the protecting region 20 before the stereograph is printed. Because the protecting region 20 is made of high transparency material with waterproof function, oilproof function, and anti UV function, the ribbon 16 also has protecting function and grating function when manufacturing the lenticular lens structure 22 on the surface of the protecting region 20, so that a user can print the stereograph by a common print device 10, such as the dye sublimation printer, rapidly and simply. Material and view angles of the lenticular lens structure 22 depend on actual design demand. Then, the user installs the ribbon 16 including the protecting region 20 whereon the lenticular lens structure 22 is manufactured and the plurality of dye regions 18 inside the print device 10, and the print device 10 can start to print the stereograph.

First, the control unit 26 of the print device 10 receives the target image datum processed by stereographic image processing, and sets the correlation between the plurality of dye regions 18 of the ribbon 16 and the print medium 14 and the correlation between the protecting region 20 of the ribbon 16 and the print medium 14 according to the target image datum, respectively. After that, the control unit 26 controls the actuating unit 12 to move the print medium 14 in a predetermined speed and controls the thermal print head 24 to transfer the plurality of dye regions 18 including the yellow dye region Y, the magenta dye region M, the cyan dye region C, the black dye region K onto corresponding positions of the print medium 14 moving in the predetermined speed according to the set correlation, so as to generate the stereograph. However, a viewer can not view a three-dimensional image by directly watching the stereograph only with the plurality of dye regions 18. Thus, the control unit 26 can control the thermal print head 24 to transfer the protecting region 20 onto the corresponding positions of the print medium 14 whereon the stereograph is printed according to the set correlation, which means the protecting region 20 covers on the stereograph. Therefore, the protecting region 20 can prevent the stereograph from being oozed, faded, or polluted by moisture or oil sludge. In addition, the view can view the stereograph via the protecting region 20 whereon the lenticular lens structure 22 is manufactured so as to generate the three-dimensional image.

Comparing to the prior art, the print device of the present invention can utilize the common print device to print the stereograph, and does not additionally set a glued mechanism for gluing the lenticular lens structure on the print medium. The lenticular lens structure is manufactured on the protecting region of the conventional ribbon in the present invention, and the protecting region whereon the lenticular lens structure is manufactured is transferred onto the print medium, so as to generate the stereograph. Therefore, the present invention can decrease printing time, economize printing cost, and improve operating convenience, effectively.

Those skilled in the art will readily observe that numerous modifications and alterations of the device and method may be made while retaining the teachings of the invention.

What is claimed is:

1. A method for printing a stereograph comprising:
   manufacturing a lenticular lens structure on a surface of a protecting region of a ribbon wherein the ribbon comprises a plurality of dye regions and the protecting region;
   receiving a target image datum;
   conveying a print medium;

transferring the plurality of dye regions of the ribbon onto the print medium respectively according to the target image datum when conveying the print medium; and transferring the protecting region of the ribbon onto the print medium after transferring the plurality of dye regions of the ribbon onto the print medium.

2. The method of claim 1 further comprising:

setting a correlation between the plurality of dye regions of the ribbon and the print medium according to the target image datum.

3. The method of claim 1 further comprising:

setting a correlation between the protecting region of the ribbon and the print medium according to the target image datum.

4. The method of claim 1, wherein receiving the target image datum comprises receiving an interlaced image datum.

5. The method of claim 1, wherein the plurality of dye regions comprises a yellow dye region, a magenta dye region, a cyan dye region, and a black dye region.

6. The method of claim 1, wherein the lenticular lens structure is a narrow angle lenticular lens structure.

7. The method of claim 1, wherein the lenticular lens structure is a wide angle lenticular lens structure.

8. The method of claim 1, wherein the protecting region is made of soft material.

9. The method of claim 1, wherein the protecting region is made of hard material.

10. The method of claim 1, wherein the plurality of dye regions and the protecting region of the ribbon are transferred onto the print medium in a thermal sublimated manner.

11. A print device comprising:

an actuating unit for conveying a print medium;

a ribbon comprising a plurality of dye regions and a protecting region, a lenticular lens structure being formed on a surface of the protecting region;

a thermal print head for transferring the plurality of dye regions and the protecting region of the ribbon onto the print medium, respectively; and a control unit coupled to the actuating unit and the thermal print head for controlling the actuating unit to convey the print medium according to a target image datum and for controlling the thermal print head to transfer the plurality of dye regions and the protecting region of the ribbon onto the print medium, respectively.

12. The print device of claim 11, wherein the control unit is for setting a correlation between the plurality of dye regions of the ribbon and the print medium according to the target image datum.

13. The print device of claim 11, wherein the control unit is for setting a correlation between the protecting region of the ribbon and the print medium according to the target image datum.

14. The print device of claim 11, wherein the target image datum is an interlaced image datum.

15. The print device of claim 11, wherein the plurality of dye regions comprises a yellow dye region, a magenta dye region, a cyan dye region, and a black dye region.

16. The print device of claim 11, wherein the lenticular lens structure is a narrow angle lenticular lens structure.

17. The print device of claim 11, wherein the lenticular lens structure is a wide angle lenticular lens structure.

18. The print device of claim 11, wherein the protecting region is made of soft material.

19. The print device of claim 11, wherein the protecting region is made of hard material.

20. The print device of claim 11 being a dye sublimation printer.

\* \* \* \* \*